(12) United States Patent
Majocka

(10) Patent No.: US 8,210,198 B1
(45) Date of Patent: Jul. 3, 2012

(54) WALL HYDRANT WITH SUPPORT BRACKETS

(75) Inventor: Christopher A. Majocka, Erie, PA (US)

(73) Assignee: Zurn Industries, LLC, Erie, PA (US)

( * ) Notice: Subject to any disclaimer, the term of this patent is extended or adjusted under 35 U.S.C. 154(b) by 804 days.

(21) Appl. No.: 11/643,637

(22) Filed: Dec. 21, 2006

Related U.S. Application Data

(60) Provisional application No. 60/752,572, filed on Dec. 21, 2005.

(51) Int. Cl.
*F16L 5/00* (2006.01)
(52) U.S. Cl. .................. 137/360; 220/3.2; 248/214
(58) Field of Classification Search .......... 137/343, 137/356, 357, 359, 360, 361; 33/613; 220/3.2, 220/3.9; 248/214
See application file for complete search history.

(56) References Cited

U.S. PATENT DOCUMENTS

| | | | | | |
|---|---|---|---|---|---|
| 2,824,312 | A | * | 2/1958 | Tortorice | .......... 4/695 |
| 3,214,126 | A | * | 10/1965 | Roos | .......... 248/318 |
| 3,810,311 | A | * | 5/1974 | Pingel | .......... 269/315 |
| 6,698,103 | B2 | * | 3/2004 | Nortier et al. | .......... 33/645 |

OTHER PUBLICATIONS

Zurn, Z1350 Narrow Wall Hydrant, Jul. 2001, pp. 63-64.
Zurn, Z1349 Narrow Wall Hydrant, Jul. 2001, pp. 61-62.
Zurn, Z1349 and Z1350 Narrow Wall Hydrants, Jul. 2001, p. 10.

* cited by examiner

*Primary Examiner* — Kevin Lee
*Assistant Examiner* — Macade Brown
(74) *Attorney, Agent, or Firm* — The Webb Law Firm

(57) ABSTRACT

A wall hydrant assembly for movably positioning a wall hydrant between a first and second structural member includes a first and second rail adapted to be secured to the first and second structural member. The first rail is adapted to engage a first portion of the wall hydrant and the second rail is adapted to engage a second portion of the wall hydrant to allow the wall hydrant to move substantially along the length of the first and second rails. The wall hydrant assembly can include first and second tabs which co-act with the first and second rails. The first and second rails can each define an elongated slot. The first and second tabs can each include a shaft which co-acts with the elongated slot to allow the wall hydrant to be moveable along the first and second rails.

37 Claims, 5 Drawing Sheets

WALL HYDRANT WITH SUPPORT BRACKETS

CROSS REFERENCE TO RELATED APPLICATIONS

This application claims the benefit of U.S. Provisional Patent Application No. 60/752,572, filed Dec. 21, 2005, the entire content of which is incorporated herein by reference.

BACKGROUND OF THE INVENTION

1. Field of the Invention

The present invention relates generally to a wall hydrant and, more particularly, to an adjustable wall hydrant assembly.

2. Description of Related Art

Wall hydrants typically include a hollow tube having an inlet end and an outlet end. The inlet end is typically adapted for connection to a source of fluid under pressure. The outlet end is typically fitted with valve means for controlling the flow of fluid therefrom. Specifically, wall hydrants are set within predefined areas of a wall, and are connected to plumbing lines. The existing method for installing a wall hydrant typically includes installation of one or more braces within a stud wall and attaching the wall hydrant thereto. Typically, the braces are fashioned of wood and usually require custom-fitting to the desired area in order to properly align a wall hydrant within a specific desired area of a wall. Prior art wall hydrants are known, such as the Narrow Wall Hydrant Model No. Z1350 manufactured by Zurn Industries, Inc. having a plurality of threaded studs adapted to be secured to a wooden brace.

Use of the existing method requires an installer to obtain additional materials on a job site to form ad-hoc size-specific braces, and to adjust the braces to both fit within the wall and to accommodate the dimensions of the wall hydrant. Installation of a wall hydrant and braces typically contributes to increased labor costs. Furthermore, it is often desirable to install a wall hydrant in a level horizontal orientation. Accordingly, adjustments to the horizontal orientation of the wall hydrant may require additional bracing and further increase labor expenditures. In addition, wall hydrants that are fitted within openings in wall coverings, such as drywall, may also require additional bracing to accommodate pre-existing wall placement restrictions.

Accordingly, there is a need to provide a wall hydrant and method of installing a wall hydrant at a desired location that eliminates the need for the manufacture of ad-hoc size-specific braces.

SUMMARY OF THE INVENTION

It is, therefore, an object of this invention to provide a wall hydrant assembly for adjustably supporting a wall hydrant between studs or other structural supports.

It is another object of the present invention to provide a wall hydrant assembly including a wall hydrant having a body; and a first rail attached to a first portion of the body of the wall hydrant, wherein the wall hydrant is moveable along the first rail.

It is another object of the present invention to provide a combination of a first rail having a first end and a second end, the first end adapted to be secured to a first structural member and the second end adapted to be secured to a second structural member, the first rail defining a first elongated slot; a second rail having a first end and a second end, the first end adapted to be secured to the first structural member and the second end adapted to be secured to the second structural member, the second rail defining a second elongated slot; and a wall hydrant having a first portion adapted to engage the first elongated slot and a second portion adapted to engage the second elongated slot, wherein the wall hydrant is moveable along the first rail and second rail.

It is yet another object of the present invention to provide a method for securing a wall hydrant to a structural member comprising the steps of securing a first end of a first rail to a first structural member; securing a second end of the first rail to a second structural member, wherein the first rail defines a first elongated slot; and providing a wall hydrant having a first portion adapted to engage the first elongated slot, wherein the wall hydrant is moveable along the first rail.

These and other advantages of the present invention will be understood from the description of the preferred embodiments, taken with the accompanying drawings, wherein like reference numerals represent like elements throughout.

DETAILED DESCRIPTION OF THE INVENTION

Figure 1:
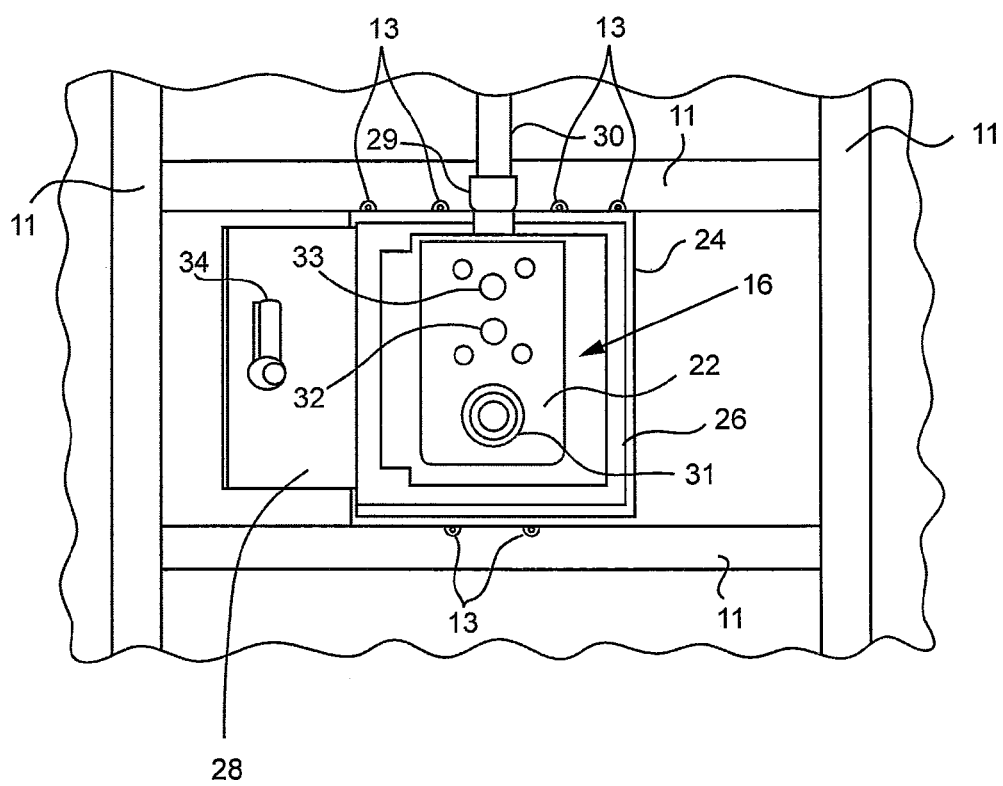
FIG. 1 is a front plan view of a prior art wall hydrant supported by wooden studs.

For purposes of the description hereinafter, spatial or directional terms shall relate to the invention as it is oriented in the drawing figures. However, it is to be understood that the invention may assume various alternative variations, except where expressly specified to the contrary. It is also to be understood that the specific components illustrated in the attached drawings, and described in the following specification, are simply exemplary embodiments of the invention. Hence, specific dimensions and other physical characteristics related to the embodiments disclosed herein are not to be considered as limiting.

As shown in FIG. 1, a wall hydrant 16 of the prior art includes a wall hydrant 16, such as a narrow wall hydrant 22 secured to a box structure or body 24. The box structure or body 24 can include a frame 26 with an attached cover 28. In another embodiment, the body 24 can include at least a portion of the wall hydrant 16. The narrow wall hydrant 22 includes a connection 29 for receiving one or more plumbing lines 30 to provide liquid to, or remove liquid from, the narrow wall hydrant 22. In one embodiment, the connection 29 includes a valve (not shown) for providing pressurized water to the narrow wall hydrant 22. The narrow wall hydrant 22 can also include a nozzle 31 to supply liquid to a structure, such as a hose or faucet internal to a commercial or residential structure. Operating plunger 32 and stop plunger 33 can also be provided integral with the narrow wall hydrant 22 to allow for the start and stop of fluid flow through the nozzle 31. The cover 28 may also include a lock assembly 34 for locking and unlocking the cover 28 via a key (not shown), thereby providing controlled access to the operation of the narrow wall hydrant 22. Exemplary wall hydrants include the Narrow Wall Hydrant Model No. Z1350 manufactured by Zurn Industries, Inc. and the Narrow Wall Hydrant Model No. Z1349 also manufactured by Zurn Industries, Inc.

Referring again to FIG. 1, the prior art wall hydrant assembly 10 is secured to a plurality of wooden braces 11 constructed in an intersecting horizontal and vertical direction. The wall hydrant assembly 10 is secured to the wooden braces 11 by a plurality of threaded studs 13 integral with the wall hydrant assembly 10. Typically, the wooden braces 11 are specifically constructed to provide a support frame for the hydrant in the desired area.

Figure 2:
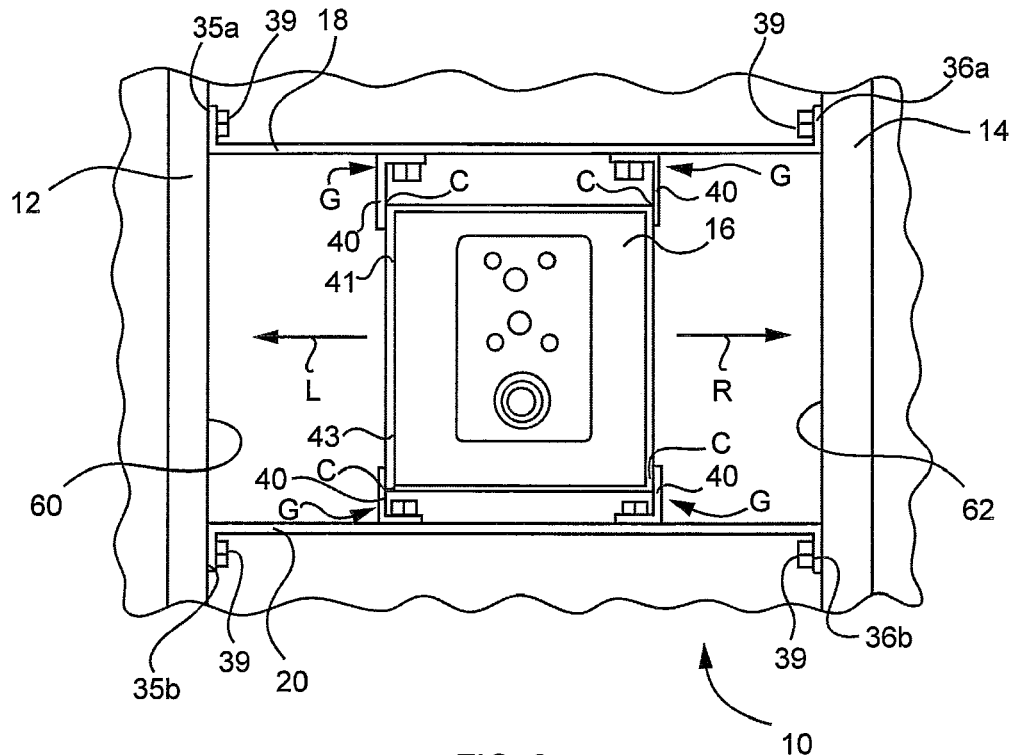
FIG. 2 is a front plan view of a wall hydrant assembly in accordance with the present invention supporting the wall hydrant in a central position.

As shown in FIG. 2, a wall hydrant assembly 10 of the present invention, shown in a centrally mounted position, includes a wall hydrant 16 situated between a first structural member 12 and a second structural member 14, and is moveable between and/or substantially along a first rail 18 and a second rail 20 in the direction of the arrows L and R, as shown. As used herein, the term "wall hydrant" means any fixture including a liquid inlet and/or liquid outlet that is positionable within a wall, ceiling and or floor of a commercial or residential structure. It is anticipated herein that slight modifications, as would be understood by those of ordinary skill in the art, may be necessary to conform existing or future wall hydrants for use with the present invention.

Referring again to FIG. 2, the first structural member 12 and the second structural member 14 can be typical studs, such as standard 2"×4" studs or the like, utilized in commercial and residential wall construction. In one embodiment, the first structural member 12 and the second structural member 14 can be substantially parallel, such as in the substantially vertical direction or substantially horizontal direction. In another embodiment, the first structural member 12 and the second structural member 14 can be spaced apart by any suitable spacing, such as 12", 16", 24" or the like. The wall hydrant assembly 10 can be mounted in various heights and locations within the studded walls or other structural support system. Therefore, the first rail 18 and the second rail 20 may have any suitable dimensions to extend between the first structural member 12 and the second structural member 14. In one embodiment, the first rail 18 and the second rail 20 are substantially parallel to each other and substantially perpendicular to the first structural member 12 and the second structural member 14. The first structural member 12 includes an inner surface 60 and the second structural member 14 includes an inner surface 62. The inner surfaces 60, 62 face each other.

Referring again to FIG. 2, in one embodiment, the first rail 18 and the second rail 20 are similarly constructed. The first rail 18 is adapted to engage a first portion of the box structure or body 24 of the wall hydrant 16 and the second rail 20 is adapted to engage a second portion of the body of the wall hydrant 16. Generally, the first rail 18 and the second rail 20 each include respective first ends 35*a*, 35*b* and second ends 36*a*, 36*b* adapted for securement to the inner surfaces 60, 62 of the first structural member 12 and the second structural member 14, respectively. The first rail 18 and the second rail 20 may be constructed of metal, metal alloys, high-strength polymeric materials and/or other suitable sturdy materials. The first ends 35*a*, 35*b* and the second ends 36*a*, 36*b* of the first and second rails 18, 20 may each include an angled area that is oriented substantially at a 90° angle with respect to the first or second rails 18, 20. In one embodiment, the angled area includes a bent portion of the first or second rails 18, 20. The angled area may contact a surface, such as a planar surface, of the first structural member 12 or the second structural member 14 in a substantially flush manner. The angled area may include a cut-out for accommodating a fastener 39, such as a screw, bolt, pin or the like, therethrough to secure the first or second rails 18, 20 to the first or second structural members 12, 14. As shown in FIG. 2, the angled areas may be secured to the inner surfaces 60, 62 of the first and second structural members 12, 14. It is to be understood that the aforementioned rail construction is for exemplary purposes and that other suitable configurations may be utilized in the construction of the rail and securing thereof.

Figure 3:
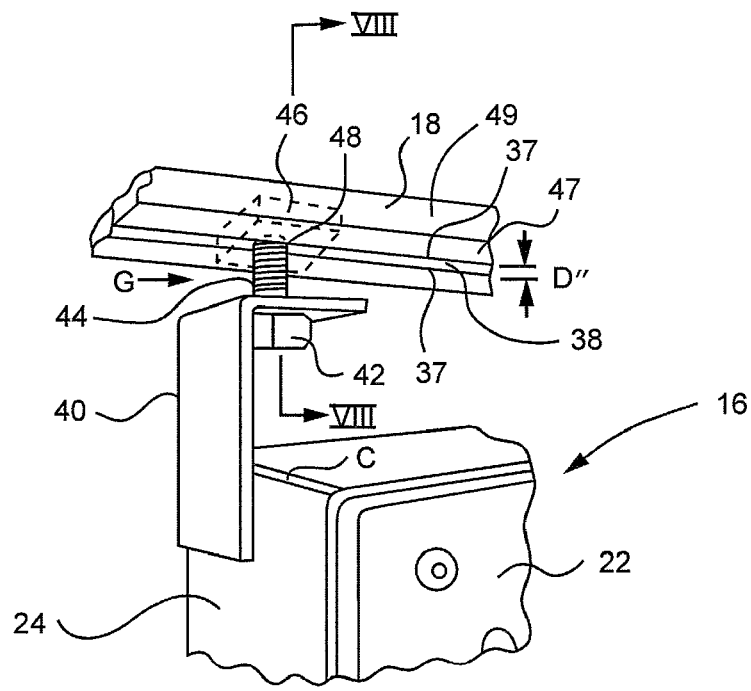
FIG. 3 is a perspective cutaway view of an attachment mechanism for attaching the wall hydrant to the wall hydrant assembly in accordance with the present invention.
Figure 8:
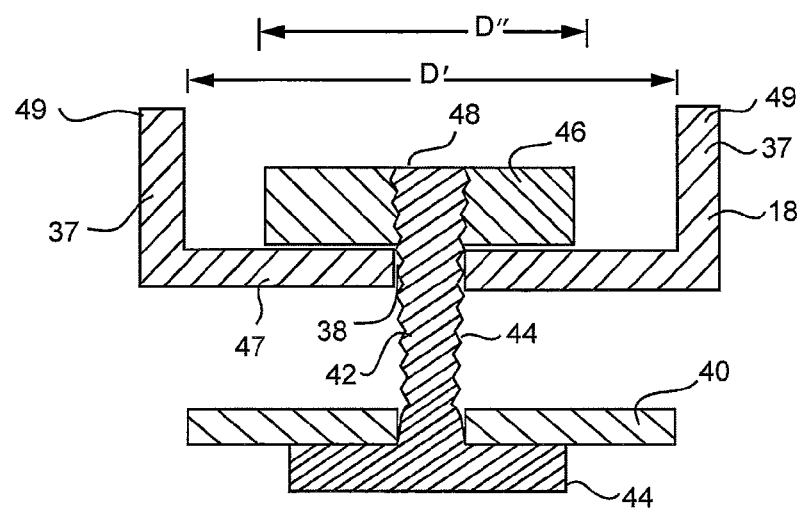
FIG. 8 is a section view taken along lines VIII-VIII of FIG. 3.

As shown in FIGS. 3 and 8, the first rail 18 and the second rail 20 may define a channel, such as a first and second elongated slot 38 defined in the first rail 18 and second rail 20, respectively. The first and second elongated slots extend along a first axis. The first and second elongated slots extend substantially from the first end to the second end. An exemplary construction of the channel 38 may include the sides 37 of the first or second rails 18, 20 turned inwardly, thereby forming a U-shaped channel in the direction facing away from the wall hydrant 16. The wall hydrant 16 is adapted to move along the length of the elongated channel extending along the first and second rails 18, 20, as shown in FIG. 2 by the arrows L and R.

Figure 4:
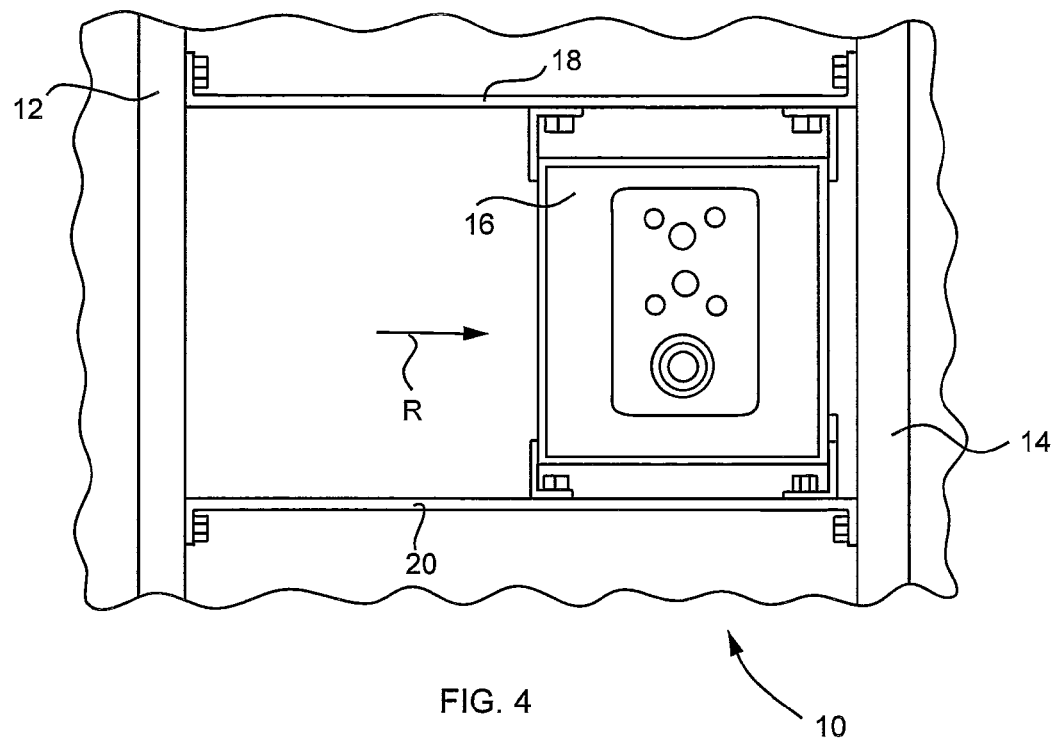
FIG. 4 is a front plan view of the wall hydrant assembly in accordance with the present invention supporting the wall hydrant in a right position.

As shown in FIG. 4, the wall hydrant 16 of the wall hydrant assembly 10 is positioned in a rightwardly directed orientation, indicated by the R arrow, along the first and second rails 18, 20 and between the first and second structural members 12, 14.

Figure 5:
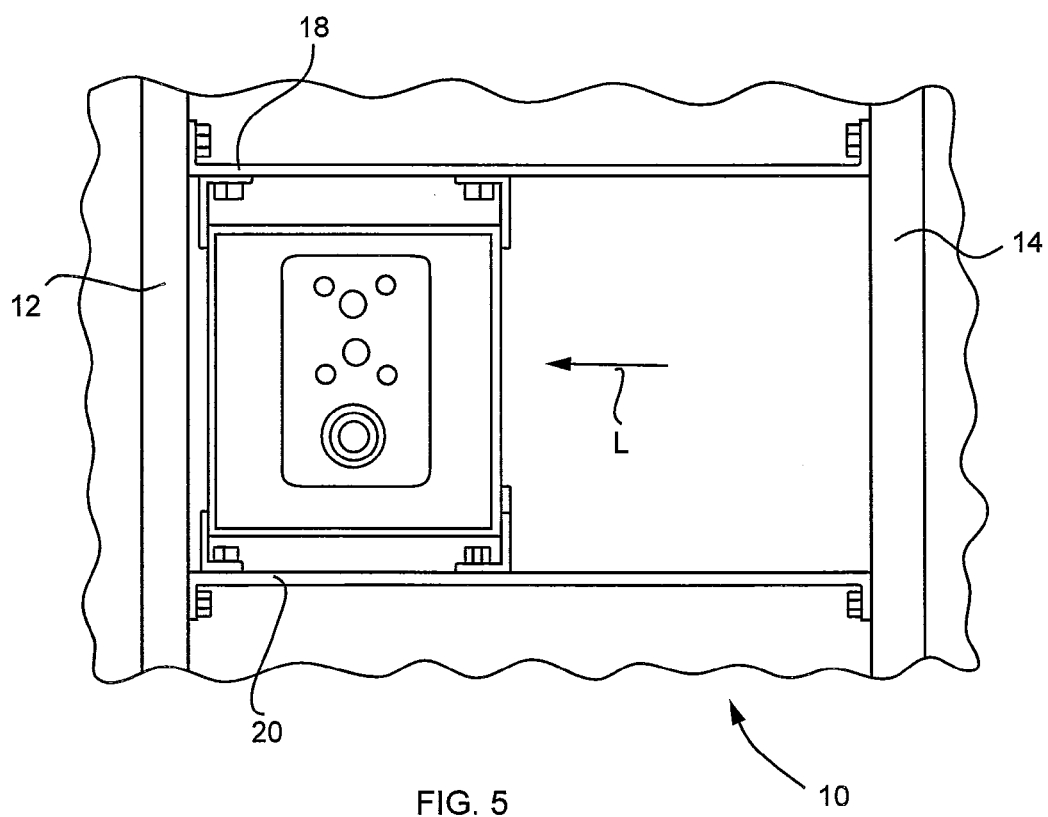
FIG. 5 is a front plan view of a wall hydrant assembly in accordance with the present invention supporting a wall hydrant in a left position.

As shown in FIG. 5, the wall hydrant 16 of the wall hydrant assembly 10 is positioned in a leftwardly directed orientation, indicated by the L arrow, along the first and second rails 18, 20 and between the first and second structural members 12, 14. It is also to be understood that the wall hydrant 16 may be shifted along the first or second rails 18, 20 in either direction to assume various other positions between the first and second structural members 12, 14.

Referring again to FIG. 3, in a desirable embodiment, the box 24 of the wall hydrant 16 includes a plurality of depending first and second tabs 40 (also shown in FIG. 2) attached thereto. As shown in FIG. 2, four tabs 40 are provided adjacent to the four corners C of the box structure or body 24. In one embodiment, a first L-shaped tab 40 can be secured to a first portion of the wall hydrant 16 and a second L-shaped tab 40 can be secured to a second portion of the wall hydrant 16. In one embodiment, the depending tabs 40 define an L-shape having a first portion extending substantially parallel to the first and second structural member and a second portion extending substantially parallel to the first rail and are secured to the box structure 24 by welding or conventional adhesion techniques. In another embodiment, as shown in FIG. 2, a first tab 40 may be secured to the top portion 41 of the box 24 and a second tab 40 may be secured to the bottom portion of the box 24. Alternatively, a first tab 40 can be secured to the right side of the box 24 and a second tab 40 can be secured to the left side of the box. In another embodiment, a tab 40 is located at each upper corner C of the wall hydrant 16 or box 24, adjacent the first portion 41. In yet another embodiment, a tab 40 is located at each lower corner C of the wall hydrant 16 or box 24, adjacent the second portion.

As shown in FIGS. 3 and 8, each of the tabs 40 may accommodate a shaft 42, such as a pin or bolt therethrough. Each shaft 42 may include a threaded portion 44 sized to be received into the elongated slot 38 to depend from one of the respective first and second rails 18, 20 to co-act therewith. Each of the shafts 42 co-act with a guide 46 which may be recessed within the rail 18 and sized to move within the U-shape of the rail 18 of one of the respective first and second rails 18, 20. The U-shape is defined by a body portion 47 containing the slot and two depending legs 49 spaced apart from the sides of the body portion 47. The guide 46 may include a threaded hole 48 to threadably receive the threaded portion 44 of the shaft 42. Accordingly, the wall hydrant 16 including the tabs 40, by virtue of being connected to the guide 46 that is slidably engaged within one of the first and second rails 18, 20, may be moved along the length of the first and second rails 18, 20. Therefore, the present arrangement includes four guiding and locking arrangements G that each include a tab 40, a bolt 42, and a guide 46. Although only one complete arrangement G is shown in FIGS. 3 and 8, it is to be understood that the other arrangements G shown in the Figures may include all of these elements. In one embodiment, the shaft 42 can be advanced to tighten the tabs 40 against the guide 46 to secure the wall hydrant 16 at a fixed location along the first or second rails 18, 20. As shown in FIG. 3, the guide may be substantially square shaped and be made of metal or polymer material. The guide has a width D which is less than the internal spacing D' of legs 49 and of rail 18, but greater than the width D" of the slot 38. The diameter of the threaded portion 44 is less than D".

Figure 6:
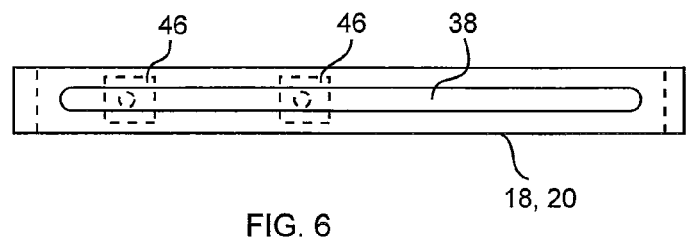
FIG. 6 is a top plan view of a rail of the wall hydrant assembly in accordance with the present invention.

As shown in FIG. 6, the guide 46 extends at least partially beyond the opening of the elongated slot 38 to restrain the movement of the wall hydrant 16 within the direction of the elongated slot 38 of the first or second rails 18, 20. It is to be understood that the wall hydrant 16 may be slidably engaged with the first and second rails 18, 20 via various mechanisms, and that the aforementioned configuration is only an exemplary embodiment and is not to be construed as limiting the present invention. It is also to be understood that the narrow wall hydrant 22 or other wall hydrant, may be directly slidably engaged with the first and second rails 18, 20 if no box 24 or surrounding enclosure is used in connection with the narrow wall hydrant 22.

Figure 7:
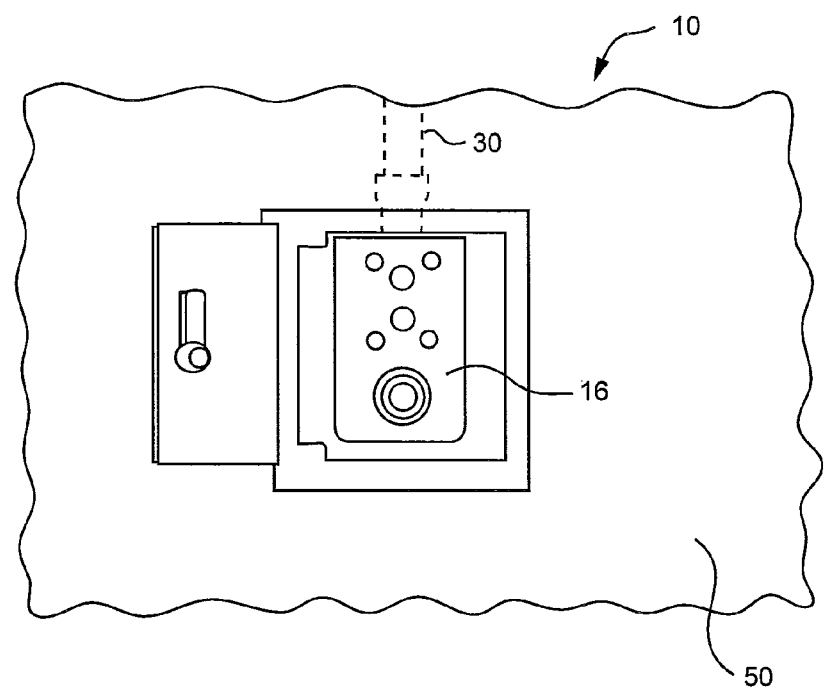
FIG. 7 is a front plan view of the wall hydrant assembly in accordance with the present invention mounted within a wall covering.

As shown in FIG. 7, the wall hydrant assembly 10 allows for adjustments to be made to the horizontal orientation of the wall hydrant 16 with respect to installation of a wall covering 50, such as drywall or sheet rock. Once the proper position of the wall hydrant 16 has been established, the respective shaft or other locking mechanism may be tightened against the respective tabs and the respective guides to prevent movement of the wall hydrant 16 with respect to the first and/or second rails by frictional engagement. Thereafter, the plumbing line 30 may be connected to the immobilized wall hydrant 16 and the wall covering 50 may be installed. In one embodiment, the wall hydrant assembly 10 including the wall hydrant 16 and first and second rails is structured for installation within a wall, floor or ceiling, such as in an area between the rafters of other structural supports.

The invention has been described with reference to the desirable embodiments. Modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A wall hydrant assembly comprising:
   a wall hydrant having a body; and
   a first rail defining a first elongated slot, said first rail attached to a first portion of the body of the wall hydrant;
   wherein the first rail has a first end and a second end and the first elongated slot extends along a first axis, the first elongated slot extends substantially from said first end to said second end, the first end adapted to be secured to a first structural member and the second end adapted to be secured to a second structural member, each of the first structural member and second structural member, including an inner surface, the inner surfaces facing each other;
   wherein at least one of the first end or the second end include an angled area that is oriented substantially at a 90° angle with respect to the first rail, such that at least a portion of the angled area contacts the inner surface of at least one of the first structural member or the second structural member;
   wherein the angled area is secured to one of the first structural member inner surface or the second structural member inner surface; and
   wherein the wall hydrant is moveable along the first rail along the first axis substantially from the first end to the second end of the first rail; and
   a first tab secured to the first portion of the wall hydrant, the first tab co-acting with the first rail,
   wherein the first tab is an L-shaped tab having a first portion extending substantially parallel to the first structural member or second structural member, and a second portion extending substantially parallel to the first rail, the second portion of the first tab being attached to the rail via a shaft extending through the second portion.

2. The wall hydrant assembly of claim 1, wherein the first structural member and the second structural member comprise at least one of residential or commercial wall construction studs.

3. The wall hydrant assembly of claim 1, wherein the shaft co-acts with the first tab of the wall hydrant and the first elongated slot.

4. The wall hydrant assembly of claim 3, wherein the shaft is a threaded shaft.

5. The wall hydrant assembly of claim 3, further comprising a guide recessed within the first rail, wherein the shaft engages the guide through the first elongated slot.

6. The wall hydrant assembly of claim 5, wherein the shaft can be advanced into the guide to secure the wall hydrant at a fixed location along the first rail.

7. The wall hydrant assembly of claim 1, wherein at least one first tab is located at a first corner of the wall hydrant and at least one other first tab is located at a second corner of the wall hydrant.

8. The wall hydrant assembly of claim 1, further comprising a second rail spaced apart from the first rail and attached to a second portion of the body of the wall hydrant, wherein the wall hydrant is moveable along the second rail.

9. The wall hydrant assembly of claim 8, wherein the second rail has a first end and a second end, the first end adapted to be secured to a first structural member and the second end adapted to be secured to a second structural member.

10. The wall hydrant assembly of claim 9, wherein at least one of the first end or the second end of the second rail includes an angled area that is oriented substantially at a 90° angle with respect to the second rail, such that at least a portion of the angled area can contact a surface of at least one of the first structural member or the second structural member.

11. The wall hydrant assembly of claim 8, further comprising a second tab secured to the second portion of the wall hydrant, the second tab co-acting with the second rail.

12. The wall hydrant assembly of claim 11, further comprising a second shaft wherein the second rail defines a second elongated slot and the second shaft co-acts with the second tab of the wall hydrant and the second elongated slot.

13. The wall hydrant assembly of claim 12, wherein the second shaft is a threaded shaft.

14. The wall hydrant assembly of claim 12, further comprising a second guide recessed within the second rail, wherein the second shaft engages the guide through the second elongated slot.

15. The wall hydrant assembly of claim 14, wherein the second shaft can be advanced into the second guide to secure the wall hydrant at a fixed location along the second rail.

16. The wall hydrant assembly of claim 8, wherein the first rail and the second rail are substantially parallel.

17. The wall hydrant assembly of claim 8, wherein the first rail and the second rail are structured for installation within at least one of a wall, floor or ceiling.

18. The wall hydrant assembly of claim 1, wherein the first rail containing the first elongated slot has a U-shaped cross-section defined by a body portion containing the slot and two legs spaced apart from the sides of the body portion.

19. A wall hydrant assembly comprising:
a first rail having a first end and a second end, the first end adapted to be secured to a first structural member and the second end adapted to be secured to a second structural member, the first rail defining a first elongated slot extending substantially from the first to the second end;
a second rail having a first end and a second end, the first end adapted to be secured to the first structural member and the second end adapted to be secured to the second structural member, the second rail defining a second elongated slot extending substantially from the first end to the second end; and
a wall hydrant having a first portion adapted to engage the first elongated slot and a second portion adapted to engage the second elongated slot, wherein the wall hydrant is moveable along the first rail and second rail substantially from the first end to the second end of the first and second rail, wherein the first portion includes a first tab secured thereto and wherein the first tab is an L-shaped tab having a first portion extending substantially parallel to the first structural member or second structural member, and a second portion extending substantially parallel to the first rail, the second portion of the first tab being attached to the rail via a shaft extending through the second portion;
wherein each of the first structural member and second structural member includes an inner surface, the inner surfaces facing each other;
wherein at least one of the first end or the second end of the first rail include an angled area that is oriented substantially at a 90° angle with respect to the first rail, such that at least a portion of the angled area contacts the inner surface of at least one of the first structural member or the second structural member in a substantially flush manner; and
wherein the angled area is secured to one of the first structural member inner surface or the second structural member inner surface.

20. A method for securing a wall hydrant to a structural member comprising the steps of:
securing a first end of a first rail to a first structural member;
securing a second end of the first rail to a second structural member, wherein the first rail defines a first elongated slot extending substantially from the first end to the second end; and
providing a wall hydrant having a first portion adapted to engage the first elongated slot, wherein the wall hydrant is moveable along the first rail substantially from the first end to the second end, wherein the first portion includes a first tab secured thereto and wherein the first tab is an L-shaped tab having a first portion extending substantially parallel to the first structural member or second structural member, and a second portion extending substantially parallel to the first rail, the second portion of the first tab being attached to the rail via a shaft extending through the second portion;
wherein each of the first structural member and second structural member includes an inner surface, the inner surfaces facing each other;
wherein at least one of the first end or the second end of the first rail include an angled area that is oriented substantially at a 90° angle with respect to the first rail, such that at least a portion of the angled area contacts the inner surface of at least one of the first structural member or the second structural member in a substantially flush manner; and
wherein the angled area is secured to one of the first structural member inner surface or the second structural member inner surface.

21. The method of claim 20, further including the steps of:
securing a first end of a second rail to the first structural member; and
securing a second end of the second rail to the second structural member, wherein the second rail defines a second elongated slot extending substantially from the first end to the second end and wherein the wall hydrant is moveable along the second rail substantially from the first end to the second end.

22. A wall hydrant assembly comprising:
a wall hydrant having a body; and
a first rail attached to a first portion of the body of the wall hydrant,
wherein the first rail has a first end and a second end and a first elongated slot extending from the first end to the second end, the first end adapted to be secured to a first structural member and the second end adapted to be secured to a second structural member;
wherein the first end of the first rail includes a first angled area that is oriented substantially at a 90° angle with respect to the first rail, the second end of the first rail includes a second angled area that is oriented substantially at a 90° angle with respect to the first rail, such that at least a portion of the first angled area contacts a surface of the first structural member in a substantially flush manner and at least a portion of the second angled area contacts a surface of the second structural member in a substantially flush manner; and
wherein the first portion of the body of the wall hydrant includes at least one first tab having an L-shape having a first portion extending substantially parallel to the first structural member or second structural member, and a second portion extending substantially parallel to the first rail, the second portion of the first tab being attached to the rail via at least one first shaft extending through the second portion;
wherein the first angled area extends in a direction parallel to the first structural member and is secured to the first structural member, and the second angled area extends in a direction parallel to the second structural member and is secured to the second structural member; and wherein the wall hydrant is moveable along the first rail substantially from the first end to the second end of the first rail.

23. The wall hydrant assembly of claim 22, further comprising a second rail attached to a second portion of the body of the wall hydrant, wherein the wall hydrant is moveable along the second rail;

wherein the second rail has a first end and a second end and a second elongated slot extending substantially from the first end to the second end, the first end adapted to be secured to a first structural member and the second end adapted to be secured to a second structural member;

wherein the first end of the second rail includes a first angled area that is oriented substantially at a 90° angle with respect to the first rail, the second end of the second rail includes a second angled area that is oriented substantially at a 90° angle with respect to the second rail, such that at least a portion of the first angled area second rail contacts a surface of the first structural member in a substantially flush manner and at least a portion of the second angled area of the second rail contacts a surface of the second structural member in a substantially flush manner; and wherein the first angled area of the second rail extends in a direction parallel to the first structural member and is secured to the first structural member, and the second angled area of the second rail extends in a direction parallel to the second structural member and is secured to the second structural member.

24. The wall hydrant assembly of claim 23, wherein the at least one first tab comprises two first tabs secured to the first portion of the wall hydrant, the first tabs co-acting with the first rail, wherein one first tab is located at a first corner of the first portion of the wall hydrant and the other first tab is located at a second corner of the first portion of the wall hydrant, and two second tabs secured to the second portion of the wall hydrant, the second tabs co-acting with the second rail, wherein one second tab is located at a first corner of the second portion of the wall hydrant and the other second tab is located at a second corner of the second portion of the wall hydrant.

25. The wall hydrant assembly of claim 24, wherein the first tabs and second tabs are L-shaped tabs having a first portion extending substantially parallel to the first structural member or second structural member, and a second portion extending substantially parallel to the first and second rails, the second portions of the tabs being attached to the first and second rails.

26. The wall hydrant assembly of claim 24, wherein the first and second rails each contain an elongated slot and have a U-shaped cross-section defined by a body portion containing the slot and two legs spaced apart from the sides of the body portion.

27. The wall hydrant assembly of claim 26, wherein the at least one first shaft comprises two first shafts and two second shafts, wherein the first shafts co-act with the first tabs and the elongated slot of the first rail, and wherein the second shafts co-act with the second tabs and the elongated slot of the second rail.

28. The wall hydrant assembly of claim 27, further comprising two first square-shaped guides recessed within the first rail between the two legs of the first rail, two second square-shaped guides recessed within the second rail between the two legs of the second rail, wherein the first shafts engage the first guides through the elongated slot of the first rail and the second shafts engage the second guides through the elongated slot of the second rail.

29. A wall hydrant assembly comprising:

a wall hydrant having a body; and a first rail defining a first elongated slot, said first rail attached to a first portion of the body of the wall hydrant;

wherein the first rail has a first end and a second end and the first elongated slot extends along a first axis, the first elongated slot extends substantially from said first end to said second end, the first end adapted to be secured to a first structural member and the second end adapted to be secured to a second structural member, each of the first structural member and second structural member, including an inner surface, the inner surfaces facing each other;

wherein at least one of the first end or the second end include an angled area that is oriented substantially at a 90° angle with respect to the first rail, such that at least a portion of the angled area contacts the inner surface of at least one of the first structural member or the second structural member;

wherein the angled area is secured to one of the first structural member inner surface or the second structural member inner surface; and wherein the wall hydrant is moveable along the first rail along the first axis substantially from the first end to the second end of the first rail and wherein the hydrant has a top surface that faces an opening of the first elongated slot; and a first tab secured to the wall hydrant, said first tab including a first portion and a second portion, the first portion extending substantially parallel to the first structural member, the second structural member and a side of the hydrant and the second portion extending substantially parallel to and positioned between the opening of the first elongated slot and the top surface of the hydrant, the second portion of the first tab being attached to the rail via a shaft extending therethrough wherein the shaft depends from the opening of the first elongated shaft.

30. A wall hydrant assembly comprising:

a wall hydrant having a body; and a first rail defining a first elongated slot, said first rail attached to a first portion of the body of the wall hydrant;

wherein the first rail has a first end and a second end and the first elongated slot extends along a first axis, the first end adapted to be secured to a first structural member and the second end adapted to be secured to a second structural member, each of the first structural member and second structural member including an inner surface, the inner surfaces facing each other;

wherein at least one of the first end or the second end include an angled area that is oriented substantially at a 90° angle with respect to the first rail, such that at least a portion of the angled area contacts the inner surface of at least one of the first structural member or the second structural member;

wherein the angled area is secured to one of the first structural member inner surface or the second structural member inner surface; and wherein the wall hydrant is moveable along the first rail along the first axis; and a first tab comprising a separate member that is secured to the first portion of the body of the wall hydrant, the first tab co-acting with the first rail wherein the first tab is an L-shaped tab having a first portion that is secured to the body of the wall hydrant, and a second portion being attached to the rail via a shaft extending through the second portion.

31. The wall hydrant assembly of claim 30, wherein the L-shaped member is configured and secured to the first portion of the body of the wall hydrant to create a space between the first portion of the body of the wall hydrant and the first rail.

32. A wall hydrant assembly comprising:
a first rail having a first end and a second end, the first end adapted to be secured to a first structural member and the second end adapted to be secured to a second structural member, the first rail defining a first elongated slot extending substantially from the first to the second end;
a second rail having a first end and a second end, the first end adapted to be secured to the first structural member and the second end adapted to be secured to the second structural member, the second rail defining a second elongated slot extending substantially from the first end to the second end; and
a wall hydrant having a first portion adapted to engage the first elongated slot and a second portion adapted to engage the second elongated slot, wherein the first portion includes a first tab and the second portion includes a second tab and wherein the first tab and the second tab comprise a separate member secured to the respective first portion and the second portion of the body of the wall hydrant and wherein the first tab and second tab are L-shaped tabs having a first portion secured to the body of the wall hydrant and a second portion being attached to the respective first and second rail via a shaft extending through the second portion;
wherein each of the first structural member and second structural member includes an inner surface, the inner surfaces facing each other;
wherein at least one of the first end or the second end of the first rail include an angled area that is oriented substantially at a 90° angle with respect to the first rail, such that at least a portion of the angled area contacts the inner surface of at least one of the first structural member or the second structural member in a substantially flush manner; and
wherein the angled area is secured to one of the first structural member inner surface or the second structural member inner surface.

33. The combination of claim 32, wherein the L-shaped tabs are configured and secured to the respective first portion and second portion of the body of the wall hydrant to create a space between the respective first portion and second portion of the body of the wall hydrant and the respective first rail and second rail.

34. A method for securing a wall hydrant to a structural member comprising the steps of
securing a first end of a first rail to a first structural member;
securing a second end of the first rail to a second structural member; and
providing a wall hydrant having a first portion adapted to engage a first elongated slot, wherein the first portion includes a first tab comprising a separate member that is secured to the first portion of the body of the wall hydrant, the first tab co-acting with the first rail wherein the first tab is an L-shaped tab having a first portion that is secured to the body of the wall hydrant, and a second portion attached to the rail via a shaft extending through the second portion;
wherein each of the first structural member and second structural member includes an inner surface, the inner surfaces facing each other;
wherein at least one of the first end or the second end of the first rail include an angled area that is oriented substantially at a 90° angle with respect to the first rail, such that at least a portion of a angled area contacts the inner surface of at least one of the first structural member or the second structural member in a substantially flush manner; and
wherein the angled area is secured to one of the first structural member inner surface or the second structural member inner surface.

35. The method of claim 34, wherein the L-shaped member is configured and secured to the first portion of the body of the wall hydrant to create a space between the first portion of the body of the wall hydrant and the first rail.

36. A wall hydrant assembly comprising:
a wall hydrant having a body; and
a first rail attached to a first portion of the body of the wall hydrant,
wherein the first rail has a first end and a second end and a first elongated slot, the first end adapted to be secured to a first structural member and the second end adapted to be secured to a second structural member;
wherein the first end of the first rail includes a first angled area that is oriented substantially at a 90° angle with respect to the first rail, the second end of the first rail includes a second angled area that is oriented substantially at a 90° angle with respect to the first rail, such that at least a portion of the first angled area contacts a surface of the first structural member in a substantially flush manner and at least a portion of the second angled area contacts a surface of the second structural member in a substantially flush manner; and
wherein the first angled area extends in a direction parallel to the first structural member and is secured to the first structural member, and the second angled area extends in a direction parallel to the second structural member and is secured to the second structural member;
wherein the first portion includes a first tab and the second portion includes a second tab and wherein the first tab and the second tab comprise a separate member secured to the respective first portion and the second portion of the body of the wall hydrant and wherein the first tab and second tab are L-shaped tabs having a first portion secured to the body of the wall hydrant and a second portion being attached to the respective first and second rail via a shaft extending through the second portion; and
wherein the wall hydrant is moveable along the first rail.

37. The wall hydrant assembly of claim 36, wherein the L-shaped member is configured and secured to the first portion of the body of the wall hydrant to create a space between the first portion of the body of the wall hydrant and the first rail.

* * * * *

UNITED STATES PATENT AND TRADEMARK OFFICE
CERTIFICATE OF CORRECTION

| | | |
|---|---|---|
| PATENT NO. | : 8,210,198 B1 | Page 1 of 1 |
| APPLICATION NO. | : 11/643637 | |
| DATED | : July 3, 2012 | |
| INVENTOR(S) | : Christopher A. Majocka | |

It is certified that error appears in the above-identified patent and that said Letters Patent is hereby corrected as shown below:

Column 6, Line 38, Claim 3, after "with the" delete "first tab of the wall hydrant and the"

Column 11, Line 53, Claim 34, "steps of" should read -- steps of: --

Column 12, Line 11, Claim 34, delete "a angled" and insert -- an angled --

Signed and Sealed this
Twenty-third Day of October, 2012

David J. Kappos
*Director of the United States Patent and Trademark Office*